(12) United States Patent
Chen (10) Patent No.: US 12,266,913 B2
(45) Date of Patent: Apr. 1, 2025

(54) ABNORMAL CURRENT PROTECTION DEVICE AND ABNORMAL CURRENT PROTECTION METHOD

(71) Applicant: Elite Semiconductor Microelectronics Technology Inc., Hsinchu (TW)

(72) Inventor: Isaac Y. Chen, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 247 days.

(21) Appl. No.: 18/135,935

(22) Filed: Apr. 18, 2023

(65) Prior Publication Data

US 2024/0356326 A1    Oct. 24, 2024

(51) Int. Cl.
*H02H 3/08* (2006.01)
*H02H 1/00* (2006.01)
*H02H 7/122* (2006.01)

(52) U.S. Cl.
CPC ............ *H02H 3/08* (2013.01); *H02H 1/0007* (2013.01); *H02H 7/1227* (2013.01)

(58) Field of Classification Search
CPC ....... H02H 3/08; H02H 1/0007; H02H 7/1227
See application file for complete search history.

(56) References Cited

U.S. PATENT DOCUMENTS

| | | | |
|---|---|---|---|
| 7,554,409 B1* | 6/2009 | Zhang | H03F 1/523 330/10 |
| 2009/0289612 A1 | 11/2009 | Hojo et al. | |
| 2014/0085762 A1* | 3/2014 | Shimano | H02M 7/5387 361/91.6 |
| 2018/0054130 A1* | 2/2018 | Moon | H02M 3/33515 |
| 2021/0328501 A1 | 10/2021 | Chen et al. | |
| 2021/0328502 A1 | 10/2021 | Chen et al. | |
| 2022/0399884 A1* | 12/2022 | Kaya | G01K 7/02 |
| 2024/0079867 A1* | 3/2024 | Rigoni | H02H 9/02 |

FOREIGN PATENT DOCUMENTS

TW    1707530 B    10/2020
TW    202141907 A   11/2021

OTHER PUBLICATIONS

TW Office Action cited in TW112116717, mailed Dec. 5, 2023, 11 pages.

* cited by examiner

*Primary Examiner* — Scott Bauer
(74) *Attorney, Agent, or Firm* — Cooper Legal Group LLC (57) ABSTRACT

An abnormal current protection device includes an overcurrent protector and a controller, and the overcurrent protector includes a short-circuit detection unit and an overcurrent detection unit. The short-circuit detection unit is configured to detect whether there is a short-circuit event within a period of debounce time of a protection cycle. The overcurrent detection unit is configured to detect whether there is an overcurrent event after the period of debounce time within the protection cycle. The controller is configured to disable a converter when the short-circuit event is detected, and disable a power stage when the overcurrent event is detected.

11 Claims, 6 Drawing Sheets

ABNORMAL CURRENT PROTECTION DEVICE AND ABNORMAL CURRENT PROTECTION METHOD

BACKGROUND OF THE INVENTION

The disclosure relates to an abnormal current protection device and an abnormal current protection method. More specifically, the disclosure relates to an abnormal current protection device and an abnormal current protection method which can provide protection in time for a short-circuit event occurring within a period of debounce time of a protection cycle.

To avoid mis-triggering overcurrent protection which is usually caused by an initial switching current, conventional overcurrent protection mechanisms are designed to ignore all abnormal current events within the first period of time (known as the "debounce time" or "blanking time") of each protection cycle. In other words, conventional overcurrent protection mechanisms will not be activated until the period of debounce time expires in a protection cycle. However, when a short-circuit event occurs within the period of debounce time, conventional overcurrent protection mechanisms cannot provide protection in time, such that the converter may go broken. In view of this, it is important to overcome the problem in the art.

SUMMARY OF THE INVENTION

To overcome at least the aforesaid problem, the present disclosure provides an abnormal current protection device. The abnormal current protection device may include an overcurrent protector and a controller electrically connected with overcurrent protector. The overcurrent protector may include a short-circuit detection unit and an overcurrent detection unit. The short-circuit detection unit may be configured to detect whether there is a short-circuit event within a period of debounce time of a protection cycle. The overcurrent detection unit may be configured to detect whether there is an overcurrent event after the period of debounce time within the protection cycle. The controller may be configured to disable a converter when the short-circuit event is detected, and disable a power stage when the overcurrent event is detected.

To overcome at least the aforesaid problem, the present disclosure also provides an abnormal current protection method. The abnormal current protection method may comprise steps of: detecting whether there is a short-circuit event within a period of debounce time of a protection cycle by an abnormal current protection device; disabling a converter when the short-circuit event is detected, by the abnormal current protection device; detecting whether there is an overcurrent event after the period of debounce time within the protection cycle by the abnormal current protection device; and disabling a power stage when the overcurrent event is detected, by the abnormal current protection device.

The abnormal current protection device as disclosed specially includes a short-circuit detection unit which is configured to detect whether there is a short-circuit event within the period of debounce time of each protection cycle. With the benefit from the short-circuit detection unit, the abnormal current protection device is able to detect the abnormal current caused by short-circuit within the period of debounce time of each protection cycle, and thus prevents the converter from damage in time.

The summary is not intended to limit the claimed invention, but merely provides basic profile of the claimed invention. The details of the claimed invention will be described with various embodiments as presented below.

DETAILED DESCRIPTION OF THE INVENTION

The embodiments as disclosed below are not intended to limit the claimed invention to any specific environment, applications, structures, processes or situations. In the attached drawings, elements which are not directly related to the claimed invention are omitted from depiction. Dimensions and dimensional relationships among individual elements in the attached drawings are only exemplary examples and are not intended to limit the claimed invention. Unless stated particularly, same element numerals may correspond to same elements in the following description without inconsistency with the claimed invention.

The terminology used herein is for the purpose of describing the embodiments only and is not intended to limit the claimed invention. The singular forms "a" and "an" are intended to include the plural forms as well, unless the context clearly indicates otherwise. The terms "comprises," "comprising," "includes," "including," etc., specify the presence of the stated features, integers, steps, operations, elements, and/or components, but do not preclude the presence or addition of one or more other features, integers, steps, operations, elements, components, and/or groups thereof. The term "and/or" includes any and all combinations of one or more of the associated listed items. Although the terms "first," "second," "third," etc., may be used herein to describe various elements, these elements should not be limited by these terms. These terms are merely used to distinguish one element from another element. Thus, for example, a first element described below could also be termed a second element, without departing from the spirit and scope of the claimed invention.

Figure 1:
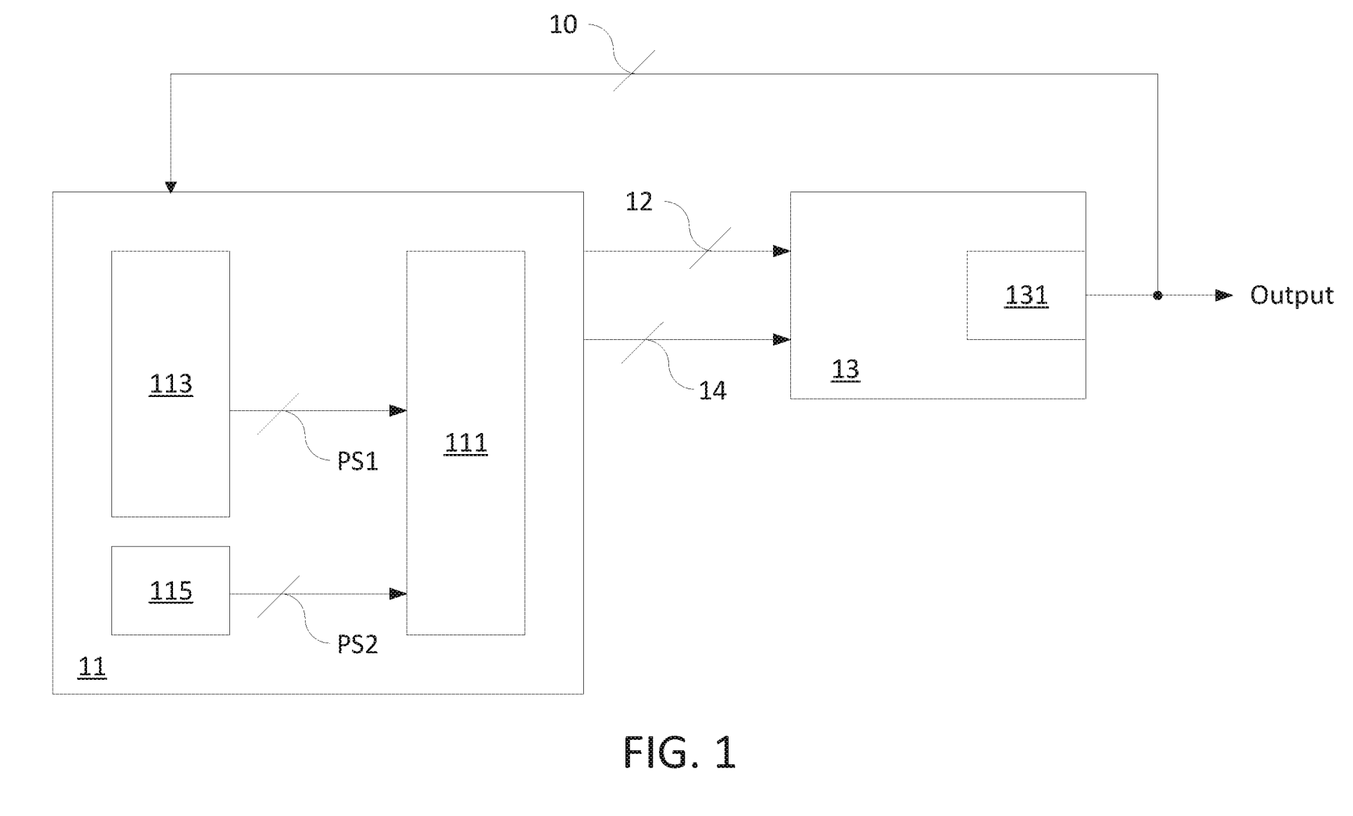
FIG. 1 schematically illustrates an abnormal current protection device according to one or more embodiments.

FIG. 1 schematically illustrates an abnormal current protection device 11 according to one or more embodiments, which is provided only for the descriptions of various embodiments and should not be regarded as any limitations to the claimed invention.

Referring to FIG. 1, the abnormal current protection device 11 may include an overcurrent protector 113 and a controller 111 which is electrically connected with the overcurrent protector 113. In some embodiments, the abnormal current protection device 11 may further include an overload protector 115 (optional element) which is electrically connected with the controller 111. The overcurrent protector 113 is configured to detect an overcurrent event and a short-circuit event based on a sensed signal 10 (a sensed current or a sensed voltage) which is fed back from the output, while the overload protector 115 is configured to detect an overload event based on the sensed signal. The controller 111 is configured to control the operations of a converter 13 according to the detection results of the overcurrent protector 113 and the overload protector 115. For example, when the overcurrent protector 113 detects an overcurrent event, the controller 111 may disable a power stage 131 of the converter 13 via a disabling signal 12. Also, when the overcurrent protector 113 detects a short-circuit event or the overload protector 115 detects an overload event, the controller 111 may disable the whole converter 13 via another disabling signal 14.

Figure 2:
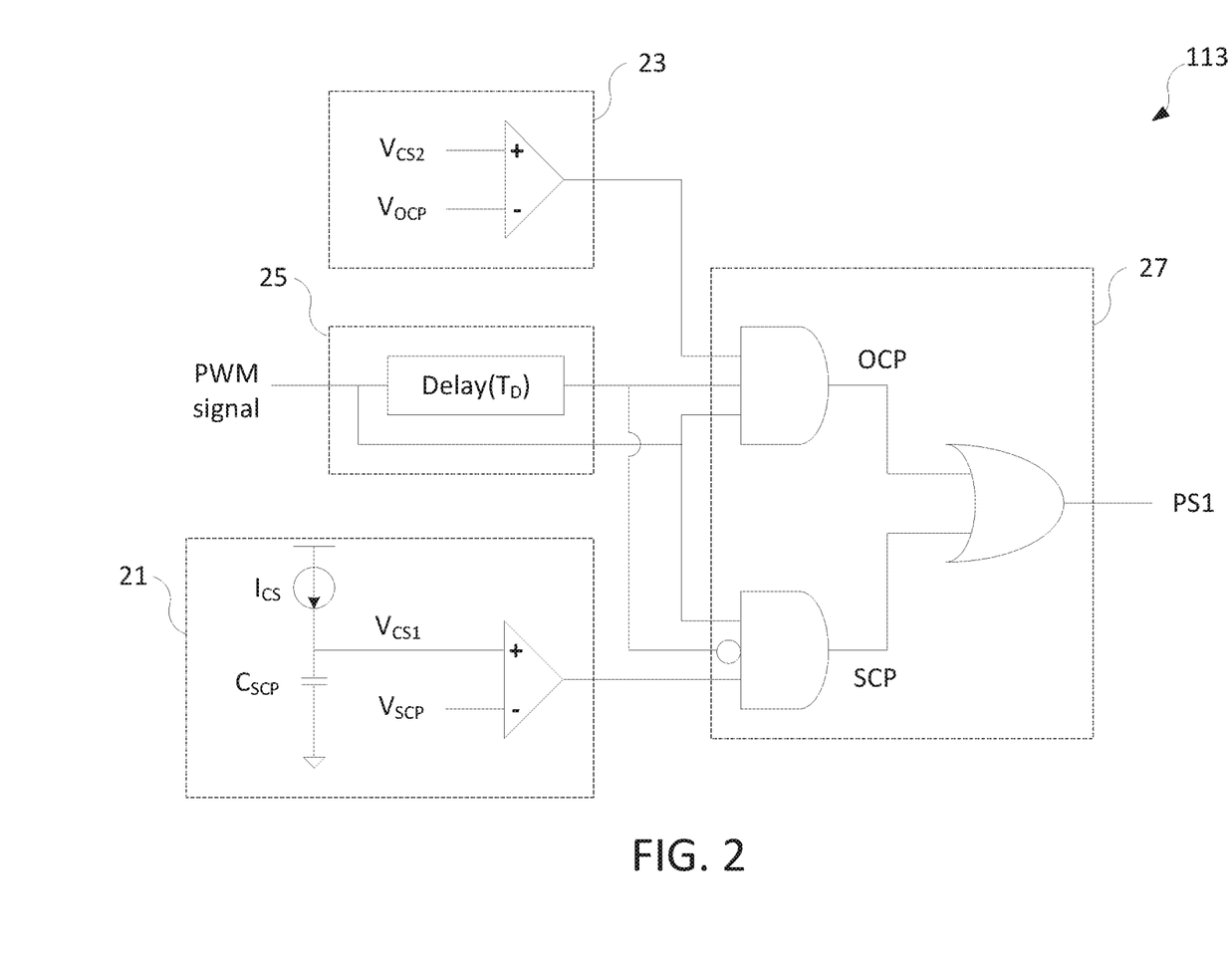
FIG. 2 schematically illustrates an overcurrent protector of the abnormal current protection device.
Figure 3:
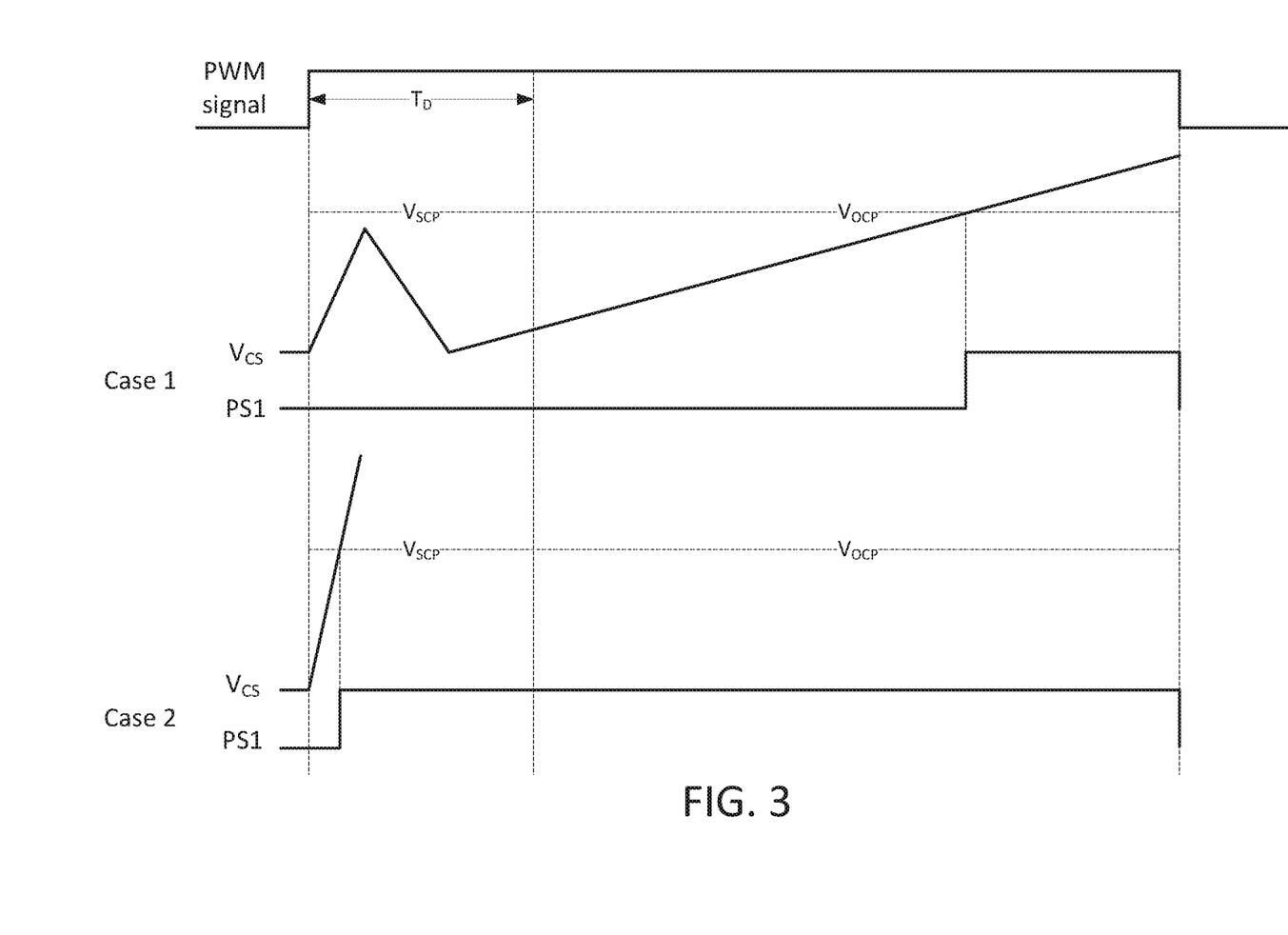
FIG. 3 provides a waveform diagram for showing the protection mechanism of the overcurrent protector.

FIG. 2 schematically illustrates the overcurrent protector 113 of the abnormal current protection device 11, while FIG. 3 provides a waveform diagram for showing the protection mechanism of the overcurrent protector 113. FIG. 2 and FIG. 3 are provided only for the descriptions of various embodiments and should not be regarded as any limitations to the claimed invention.

Referring to FIG. 2, the overcurrent protector 113 in some embodiments may include a short-circuit detection unit 21, an overcurrent detection unit 23, a filter 25, and a multiplexer 27 which is electrically connected with the short-circuit detection unit 21, the overcurrent detection unit 23 and the filter 25. The filter 25 is configured to define a period of debounce time (for example, a delay TD for each protection cycle defined by a Pulse Width Modulation (PWM) signal) for the short-circuit detection unit 21 and the overcurrent detection unit 23. With the function of the filter 25, the short-circuit detection unit 21 may be configured to detect whether there is a short-circuit event within the period of debounce time of each protection cycle, while the overcurrent detection unit 23 may be configured to detect whether there is an overcurrent event after/following the period of debounce time within each protection cycle. The short-circuit event may be caused by a short-circuit phenomenon, while the overcurrent event may be caused by a short-circuit phenomenon or other abnormal current phenomena. On the other hand, the multiplexer 27 is configured to select or limit outputs of the short-circuit detection unit 21 and the overcurrent detection unit 23, which can enable the controller 111 to appropriately control the operations of the converter 13 in due course. The multiplexer 27 can be implemented by various well-known logical gate combinations for the same function as mentioned above, and the logical gate combination (two AND gates and one OR gate) shown in FIG. 2 is merely provided as an example instead of a limitation.

In some embodiment, the short-circuit detection unit 21 may include a comparator for comparing a first voltage $V_{CS1}$ with a short-circuit protection threshold $V_{SCP}$, and the short-circuit detection unit 21 may detect a short-circuit event when the first voltage $V_{CS1}$ is larger than or equal to the short-circuit protection threshold $V_{SCP}$ within a period of debounce. The first voltage $V_{CS1}$ is an accumulated voltage and may be calculated based on an integration of a sensed current $I_{CS}$ which is a fed back from the output of the power stage 131 over a short-circuit capacitor $C_{SCP}$, as shown below:

$$V_{CS1} = \frac{\int I_{CS} dt}{C_{SCP}} = \frac{\int f(V_{CS}) dt}{C_{SCP}}$$

where the symbol $V_{CS}$ is an equivalent voltage (i.e., a current-sensed voltage at the output of the power stage 131) corresponding to the sensed current $I_{CS}$.

In some embodiment, the overcurrent detection unit 23 may include a comparator for comparing a second voltage $V_{CS2}$ with an overcurrent protection threshold $V_{OCP}$, and the overcurrent detection unit 23 may detect an overcurrent event when the second voltage $V_{CS2}$ is larger than or equal to the overcurrent protection threshold $V_{OCP}$ after the period of debounce within a protection cycle. The second voltage $V_{CS2}$ is a current-sensed voltage $V_{CS}$ at the output of the power stage 131, which may be calculated based on the sensed current $I_{CS}$ which is fed back from the output of the power stage 131. In other words, the second voltage $V_{CS2}$ is an instantaneous voltage. The overcurrent protection threshold $V_{OCP}$ may be identical to the short-circuit protection threshold $V_{SCP}$ or not, depending on different applications.

Referring to FIG. 2 and FIG. 3 together, there are two cases provided for explaining the protection mechanism of the overcurrent protector 113. In the first case, there is no short-circuit event occurring within the period of debounce, but there is an overcurrent event occurring after the period of debounce within the protection cycle. Thus, the output SCP of the AND gate keeps logical "low" within the period of debounce, while the output OCP of the AND gate and the output PS1 of the OR gate both become logical "high" when the current-sensed voltage $V_{CS}$ (i.e., the second voltage $V_{CS2}$) is larger than or equal to the overcurrent protection threshold $V_{OCP}$. In other words, the overcurrent protector 113 will only trigger overcurrent protection when the current-sensed voltage $V_{CS}$ (i.e., the second voltage $V_{CS2}$) is larger than or equal to the overcurrent protection threshold $V_{OCP}$. As the overcurrent protector 113 triggers the overcurrent protection, the controller 111 will disable the power stage 131 via the disabling signal 12. In this case, the overcurrent protector 113 substantially acts as conventional overcurrent protection mechanisms.

In the second case, there is a short-circuit event occurring within the period of debounce. Thus, the output SCP of the AND gate and the output PS1 of the OR gate both become logical "high" when the first voltage $V_{CS1}$ is larger than or equal to the short-circuit protection threshold $V_{SCP}$ within the period of debounce. Different from conventional overcurrent protection mechanisms, the overcurrent protector 113 can trigger short-circuit protection within the period of debounce because the short-circuit detection unit 21 has detected the short-circuit event since that the first voltage $V_{CS1}$ is larger than or equal to the short-circuit protection threshold $V_{SCP}$ within the period of debounce. As the overcurrent protector 113 triggers the short-circuit protection, the controller 111 will disable the converter 13 via the disabling signal 14 to prevent the converter 13 from damage. The more serious the short-circuit event is, the earlier the triggering of the short-circuit protection becomes.

Figure 4:
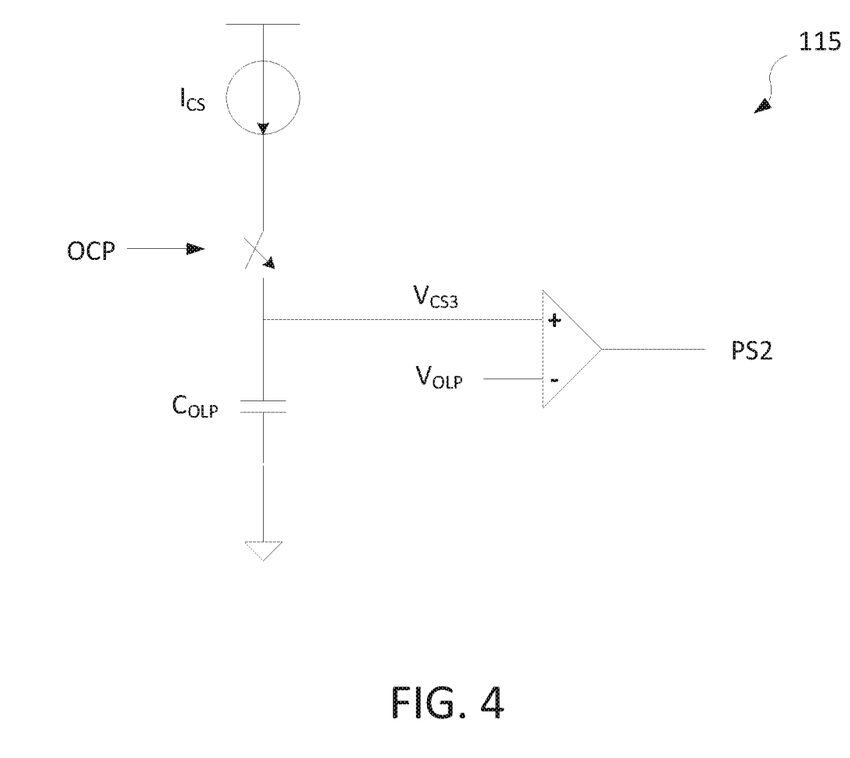
FIG. 4 schematically illustrates an overload protector of the abnormal current protection device.
Figure 5:
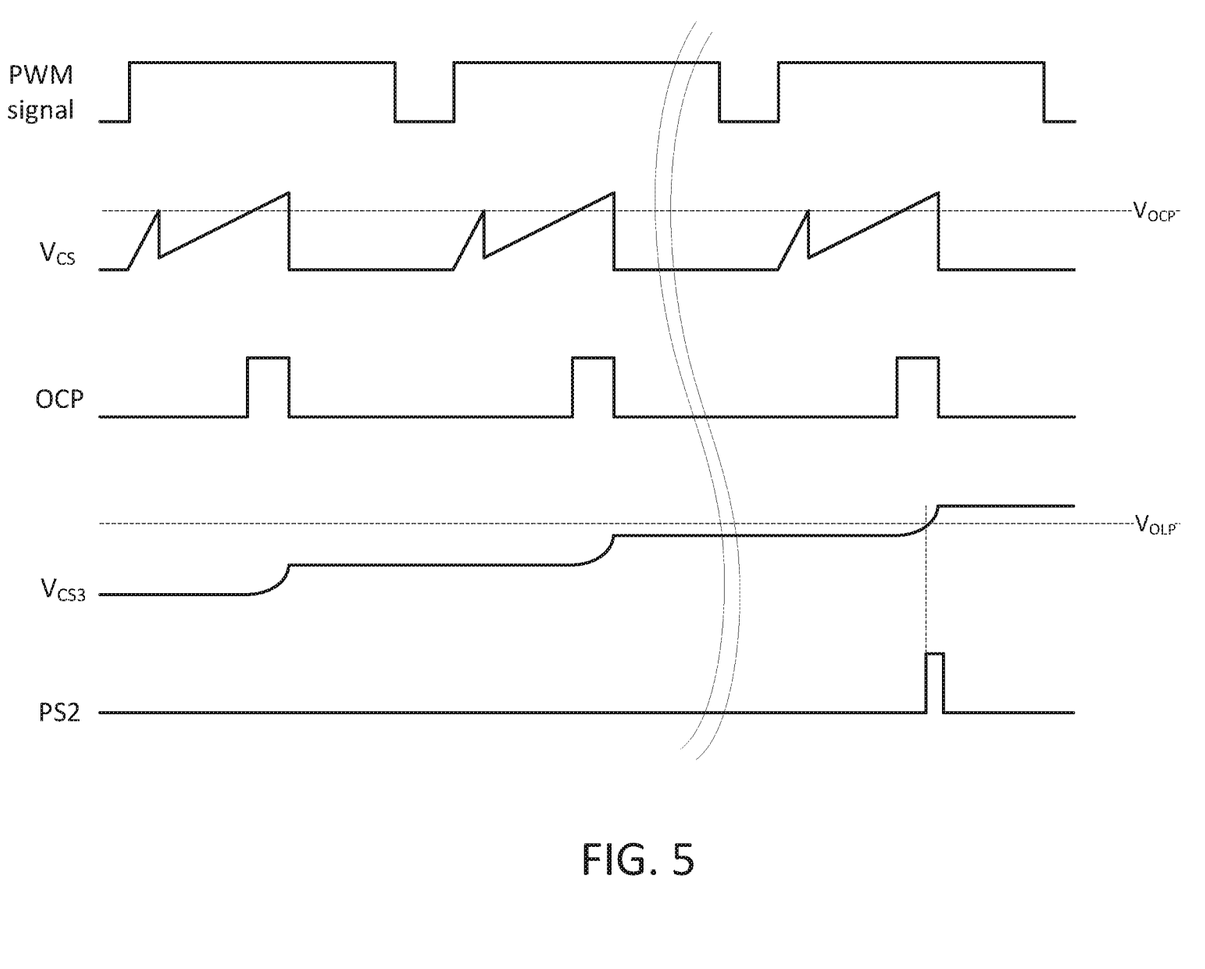
FIG. 5 provides a waveform diagram for showing the protection mechanism of the overload protector.

FIG. 4 schematically illustrates the overload protector 115 of the abnormal current protection device 11, while FIG. 5 provides a waveform diagram for showing the protection mechanism of the overload protector 115. FIG. 4 and FIG. 5 are provided only for the descriptions of various embodiments and should not be regarded as any limitations to the claimed invention.

Referring to FIG. 1 and FIG. 4, the overload protector 115 may be configured to detect whether there is an overload event across multiple protection cycles, and the controller 111 may be configured to disable the converter 13 via the disabling signal 14 when the overload event is detected. For example, in some embodiment, the overload protector 115 may include a comparator for comparing a third voltage $V_{CS3}$ with an overload protection threshold $V_{OLP}$, and the overload protector 115 may detect an overload event when the third voltage $V_{CS3}$ is larger than or equal to the overload protection threshold $V_{OLP}$. The third voltage $V_{CS3}$ is an accumulated voltage across multiple protection cycles and may be calculated based on an integration of a sensed current $I_{CS}$ which is a fed back from the output of the power stage 131 over an overload capacitor $C_{OLP}$, as shown below:

$$V_{CS3} = \frac{\int I_{CS}dt}{C_{OLP}} = \frac{\int f(V_{CS})dt}{C_{OLP}}$$

where the symbol $V_{CS}$ is an equivalent voltage (i.e., a current-sensed voltage at the output of the power stage 131) corresponding to the sensed current $I_{CS}$.

Referring to FIG. 4 and FIG. 5, every time the output OCP of the AND gate of FIG. 3 becomes logical "high," the overload capacitor $C_{OLP}$ is charged by the sensed current $I_{CS}$, and the output PS2 of the comparator will become logical "high" when the voltage across the overload capacitor $C_{OLP}$ (i.e., the third voltage $V_{SC3}$) is larger than or equal to the overload protection threshold $V_{OLP}$. As the output PS2 of the comparator become logical "high," overload protection will be triggered, and the controller 111 will disable the converter 13 via the disabling signal 14. The more serious the overload event is, the earlier the triggering of the overload protection becomes. Under such an overload protection mechanism, one-shot abnormal current can also be filtered and thus a mis-trigger for the overload protection can be avoided.

The converter 13 may be a recovery type one or a latch type one. The former may try to automatically restart at predefined intervals (called hiccup time) after it is disabled according to the disabling signal 14. In contrast, the latter will keep latched after it is disabled according to the disabling signal 14 until it is activated again.

Figure 6:
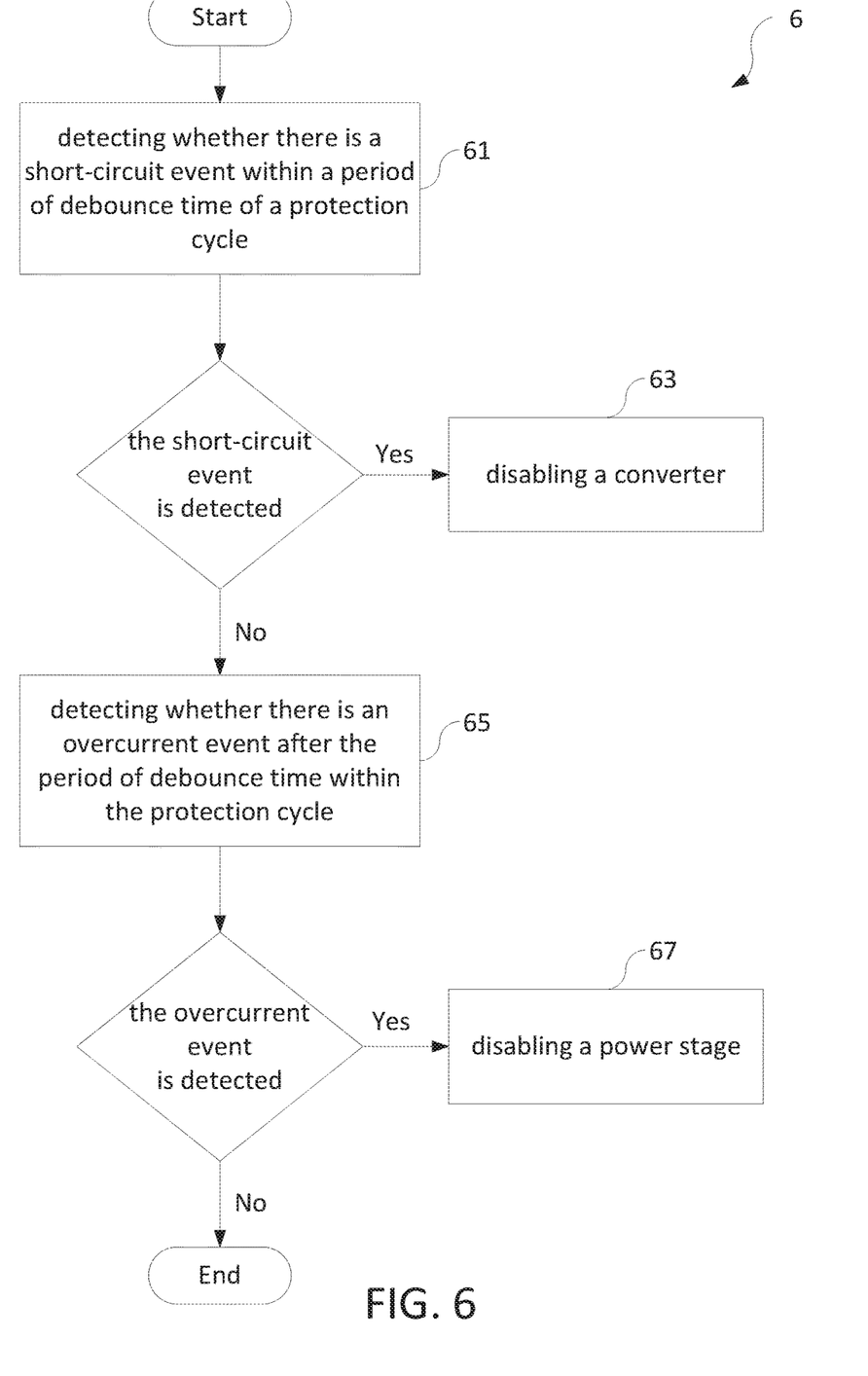
FIG. 6 schematically illustrates an abnormal current protection method according to one or more embodiments.

FIG. 6 schematically illustrates an abnormal current protection method 6 according to one or more embodiments, which is provided only for the descriptions of various embodiments and should not be regarded as any limitations to the claimed invention.

Referring to FIG. 6, the abnormal current protection method 6 may include steps of: detecting whether there is a short-circuit event within a period of debounce time of a protection cycle by an abnormal current protection device (step 61); disabling a converter when the short-circuit event is detected, by the abnormal current protection device (step 63); detecting whether there is an overcurrent event after the period of debounce time within the protection cycle by the abnormal current protection device (step 65); and disabling a power stage when the overcurrent event is detected, by the abnormal current protection device (step 67). The order of the steps 61-67 is not intended to apply any limitations to the claimed invention.

In some embodiments of the abnormal current protection method 6, the abnormal current protection device detects the short-circuit event when a first voltage is larger than or equal to a short-circuit protection threshold, and the first voltage is calculated based on an integration of a sensed current over a short-circuit capacitor.

In some embodiments of the abnormal current protection method 6, the abnormal current protection device detects the overcurrent event when a second voltage is larger than or equal to an overcurrent protection threshold, and the second voltage is calculated based on a sensed current.

In some embodiments, the abnormal current protection method 6 may further include steps of: detecting whether there is an overload event across multiple protection cycles by the abnormal current protection device; and disabling the converter when the overload event is detected, by the abnormal current protection device. It is implementable that the abnormal current protection device detects the overload event when a third voltage is larger than or equal to an overload protection threshold, and the third voltage is calculated based on an integration of a sensed current over an overload capacitor.

Each embodiment of the abnormal current protection method 6 basically corresponds to a certain embodiment of the abnormal current protection device 11. Therefore, people having ordinary skill in the art can fully understand and implement all the corresponding embodiments of the abnormal current protection method 6 just by referring to the descriptions for the abnormal current protection device 11, even though not all of the embodiments of the abnormal current protection method 6 are described in detail above.

Without inconsistency with the claimed invention, a variety of combinations, modifications and/or replacements of the directly or indirectly disclosed embodiments are substantially included in the whole disclosure, even though they are not especially mentioned above. The scopes of the claimed invention are defined by the following claims as appended.

The invention claimed is:

1. An abnormal current protection device, comprising:
an overcurrent protector, comprising:
a short-circuit detection unit, being configured to detect whether there is a short-circuit event within a period of debounce time of a protection cycle; and
an overcurrent detection unit, being configured to detect whether there is an overcurrent event after the period of debounce time within the protection cycle; and
a controller electrically connected with the overcurrent protector, being configured to disable a converter when the short-circuit event is detected, and disable a power stage when the overcurrent event is detected.

2. The abnormal current protection device of claim 1, wherein the short-circuit detection unit detects the short-circuit event when a first voltage is larger than or equal to a short-circuit protection threshold, and wherein the first voltage is calculated based on an integration of a sensed current over a short-circuit capacitor.

3. The abnormal current protection device of claim 1, wherein the overcurrent detection unit detects the overcurrent event when a second voltage is larger than or equal to an overcurrent protection threshold, and wherein the second voltage is calculated based on a sensed current.

4. The abnormal current protection device of claim 1, further comprising an overload protector electrically connected with the controller, wherein the overload protector is configured to detect whether there is an overload event across multiple protection cycles, and the controller is further configured to disable the converter when the overload event is detected.

5. The abnormal current protection device of claim 4, wherein the overload protector detects the overload event when a third voltage is larger than or equal to an overload protection threshold, and wherein the third voltage is calculated based on an integration of a sensed current over an overload capacitor.

6. The abnormal current protection device of claim 1, further comprising a filter and multiplexer, wherein the filter is configured to define the period of debounce time, and the multiplexer is configured to select outputs of the short-circuit detection unit and the overcurrent detection unit.

7. An abnormal current protection method, comprising:
   detecting whether there is a short-circuit event within a period of debounce time of a protection cycle by an abnormal current protection device;
   disabling a converter when the short-circuit event is detected by the abnormal current protection device;
   detecting whether there is an overcurrent event after the period of debounce time within the protection cycle by the abnormal current protection device; and
   disabling a power stage when the overcurrent event is detected by the abnormal current protection device.

8. The abnormal current protection method of claim 7, wherein the abnormal current protection device detects the short-circuit event when a first voltage is larger than or equal to a short-circuit protection threshold, and wherein the first voltage is calculated based on an integration of a sensed current over a short-circuit capacitor.

9. The abnormal current protection method of claim 7, wherein the abnormal current protection device detects the overcurrent event when a second voltage is larger than or equal to an overcurrent protection threshold, and wherein the second voltage is calculated based on a sensed current.

10. The abnormal current protection method of claim 7, further comprising:
    detecting whether there is an overload event across multiple protection cycles by the abnormal current protection device; and
    disabling the converter when the overload event is detected by the abnormal current protection device.

11. The abnormal current protection method of claim 10, wherein the abnormal current protection device detects the overload event when a third voltage is larger than or equal to an overload protection threshold, and wherein the third voltage is calculated based on an integration of a sensed current over an overload capacitor.

* * * * *